US010117427B1

(12) United States Patent
Lott et al.

(10) Patent No.: US 10,117,427 B1
(45) Date of Patent: Nov. 6, 2018

(54) INDEXING SPORTMAN'S CLAMP

(71) Applicant: Christopher M. Lott, Minneapolis, KS (US)

(72) Inventors: Christopher M. Lott, Minneapolis, KS (US); Terry K. Robins, Minneapolis, KS (US)

(73) Assignee: Christopher M. Lott, Minneapolis, KS (US)

( * ) Notice: Subject to any disclaimer, the term of this patent is extended or adjusted under 35 U.S.C. 154(b) by 0 days.

(21) Appl. No.: 15/467,106

(22) Filed: Mar. 23, 2017

Related U.S. Application Data

(60) Provisional application No. 62/391,569, filed on May 4, 2016.

(51) Int. Cl.
| | | |
|---|---|---|
| *A01M 31/00* | (2006.01) | |
| *F16M 13/02* | (2006.01) | |
| *F16B 2/10* | (2006.01) | |
| *F16B 2/00* | (2006.01) | |
| *F16B 2/18* | (2006.01) | |
| *F41B 5/14* | (2006.01) | |

(52) U.S. Cl.
CPC ............ *A01M 31/00* (2013.01); *F16B 2/005* (2013.01); *F16B 2/10* (2013.01); *F16B 2/185* (2013.01); *F16M 13/022* (2013.01); *F41B 5/143* (2013.01); *F41B 5/1449* (2013.01)

(58) Field of Classification Search
CPC .. B25B 5/16; B25B 5/163; B25B 5/10; B25B 5/147; F41B 5/143; F41B 5/14; F41B 5/1449; F41G 1/467
See application file for complete search history.

(56) References Cited

U.S. PATENT DOCUMENTS

| | | | | |
|---|---|---|---|---|
| 2,220,234 A | * | 11/1940 | Hadaway | A01K 97/10 |
| | | | | 248/316.5 |
| 2,280,005 A | | 4/1942 | Petersen | |
| 2,576,286 A | | 11/1951 | Eisenberg | |
| 4,305,575 A | * | 12/1981 | Bardes | B25B 5/142 |
| | | | | 269/228 |
| 5,632,262 A | | 5/1997 | Hanson | |
| 5,678,528 A | | 10/1997 | Hadley | |
| 5,775,658 A | * | 7/1998 | Englehardt | F41B 5/14 |
| | | | | 124/23.1 |
| D422,333 S | * | 4/2000 | Foster | D22/100 |

(Continued)

*Primary Examiner* — Christopher M Koehler
*Assistant Examiner* — Seahee Yoon
(74) *Attorney, Agent, or Firm* — Lathrop Gage L.L.P.

(57) ABSTRACT

One indexing clamp includes a mobile base having handle and fastening ends and locking jaws at the fastening end, an indexing post extending from the base, a shaft extending from the post, a primary prong having a cavity, and secondary prongs. A shaft diameter is smaller than a post diameter, and the shaft and post are coaxial at an axis. The primary prong is selectively positionable at first and second lowered positions and a raised position. The first and second positions are angularly offset from one another about the axis, and the primary prong is rotatable about the axis when at the raised position. A biasing member biases the primary prong away from the raised position. The post and the primary prong cavity are configured complementary to one another such that the primary prong is movable between the first and second positions only after moving to the raised position.

19 Claims, 12 Drawing Sheets

(56) References Cited

U.S. PATENT DOCUMENTS

| | | | |
|---|---|---|---|
| 6,178,959 B1 * | 1/2001 | Troncoso, Jr. | F41B 5/143 |
| | | | 124/44.5 |
| 6,626,070 B2 | 9/2003 | Peperkorn et al. | |
| D605,246 S * | 12/2009 | Hobbs | D22/108 |
| D676,515 S | 2/2013 | Mosteller | |
| D714,415 S * | 9/2014 | Wright, III | D22/107 |
| 9,032,944 B2 * | 5/2015 | Adams | F41B 5/143 |
| | | | 124/44.5 |
| 9,097,499 B2 | 8/2015 | Goehring, III et al. | |
| 2008/0086852 A1 * | 4/2008 | Hall, Jr. | B23K 37/0435 |
| | | | 24/528 |
| 2012/0216657 A1 | 8/2012 | Marks et al. | |
| 2014/0265085 A1 * | 9/2014 | Albin | B25B 5/127 |
| | | | 269/6 |

\* cited by examiner

INDEXING SPORTSMAN'S CLAMP

RELATED APPLICATIONS

This application claims priority to U.S. Provisional Patent Application Ser. No. 62/391,569, filed May 4, 2016, the disclosure of which is incorporated herein in its entirety by reference.

BACKGROUND

The current invention relates generally to devices for holding sporting devices such as bows, crossbows, firearms, and fishing poles. It may be desirable to temporarily mount such sporting devices to hunting structure (e.g., tree stands, blinds, etc.) or other environmental structure (e.g., trees, posts, etc.), and especially when the sporting devices are not actively being operated.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, an indexing clamp includes a mobile base, an indexing post extending from the mobile base, a shaft extending from the indexing post, a primary prong, and a pair of secondary prongs. Each secondary prong extends generally parallel to the primary prong, and each secondary prong is positionally fixed relative to the primary prong. The mobile base has a handle end, a fastening end, and a pair of jaws at the fastening end. The pair of jaws is selectively lockable in place relative to one another. A diameter of the shaft is smaller than a diameter of the indexing post, and the shaft and the indexing post are coaxial at an axis. The primary prong has proximal and distal ends and a cavity extending from the proximal end toward the distal end. The primary prong is selectively positionable at a first lowered position, a second lowered position, and a raised position. The first and second lowered positions are angularly offset from one another about the axis, and the primary prong is rotatable about the axis when at the raised position. A biasing member biases the primary prong away from the raised position. The indexing post and the primary prong cavity are configured complementary to one another such that the primary prong is movable from the first lowered position to the second lowered position only after the primary prong moves to the raised position.

According to another embodiment, an indexing clamp includes a pair of locking pliers, an indexing post extending from the pair of locking pliers, a shaft extending from the indexing post, a primary prong, and a pair of secondary prongs. Each secondary prong extends generally parallel to the primary prong, and each secondary prong is positionally fixed relative to the primary prong. The pair of locking pliers has a handle end, a fastening end, and a pair of jaws at the fastening end. A diameter of the shaft is smaller than a diameter of the indexing post, and the shaft and the indexing post are coaxial at an axis. The primary prong has proximal and distal ends and a cavity extending from the proximal end toward the distal end. The primary prong is selectively positionable at a first lowered position, a second lowered position, and a raised position. The first and second lowered positions are angularly offset from one another about the axis, and the first and second lowered positions are in a lowered plane that is generally perpendicular to the axis. The primary prong is rotatable about the axis when at the raised position. A biasing member biases the primary prong away from the raised position. The indexing post and the primary prong cavity are configured such that interference between the primary prong and the indexing post prevents the primary prong from moving in the lowered plane from the first lowered position to the second lowered position.

According to still another embodiment, an indexing clamp includes a pair of locking pliers, an indexing post extending from the pair of locking pliers, a shaft extending from the indexing post, and a cradle operably coupled to the shaft. The pair of locking pliers has a handle end, a fastening end, and a pair of jaws at the fastening end. A diameter of the shaft is smaller than a diameter of the indexing post, and the shaft and the indexing post are coaxial at an axis. The cradle has a primary prong and a pair of secondary prongs. The primary prong has proximal and distal ends and a cavity extending from the proximal end toward the distal end. Each secondary prong extends generally parallel to the primary prong, and each secondary prong is positionally fixed relative to the primary prong. The primary prong is selectively positionable at a first lowered position, a second lowered position, a third lowered position, and a raised position. The first, second, and third lowered positions are angularly offset from one another about the axis, and the first, second, and third lowered positions are in a lowered plane that is generally perpendicular to the axis. The primary prong is rotatable about the axis when at the raised position. A biasing member biases the primary prong away from the raised position, and the indexing post and the primary prong cavity are configured such that interference between the primary prong and the indexing post prevents the primary prong from moving in the lowered plane from: (a) any of the first lowered position, the second lowered position, and the third lowered position; to: (b) any other of the first lowered position, the second lowered position, and the third lowered position.

DETAILED DESCRIPTION

Figure 1:
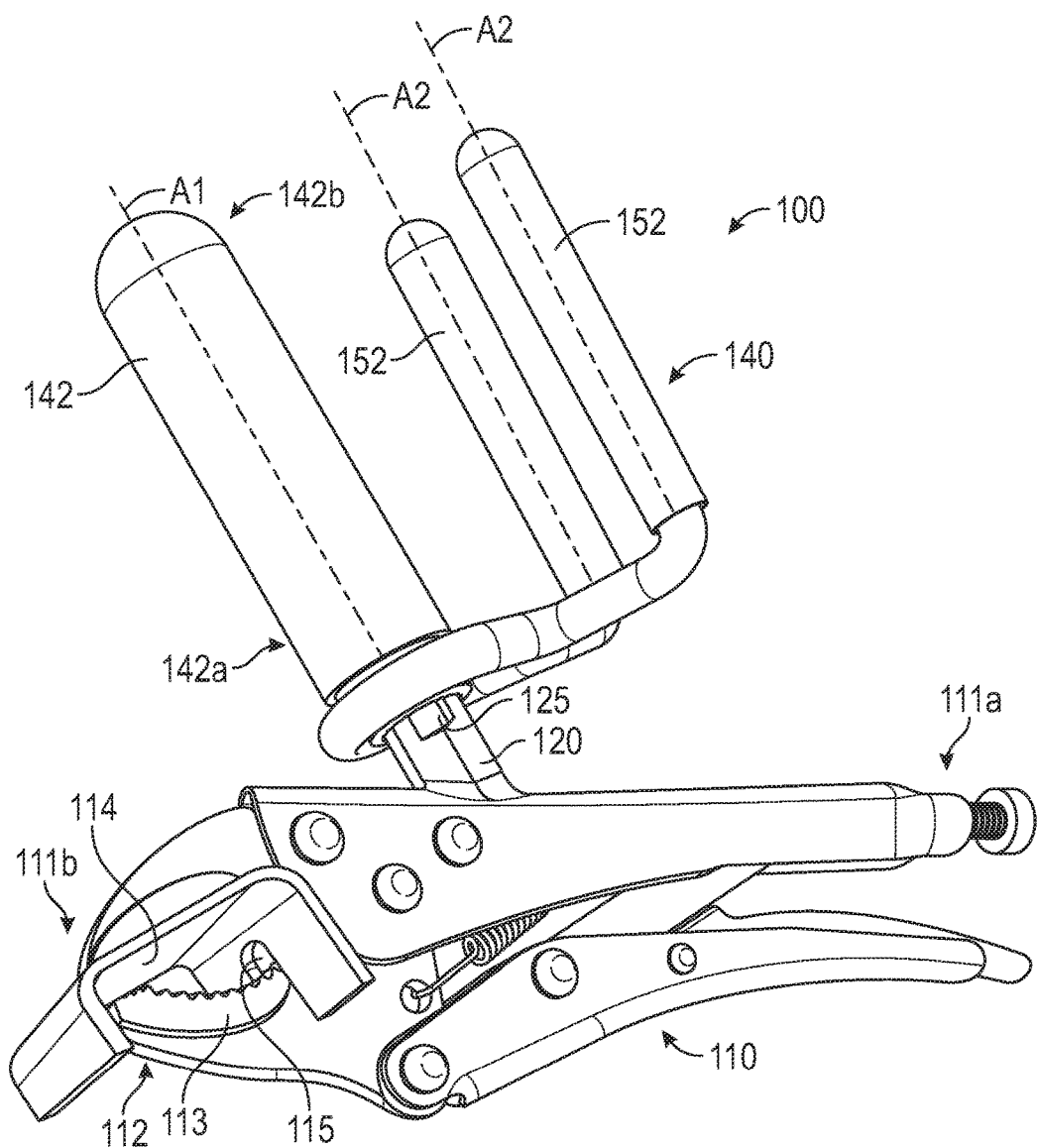
FIG. 1 is a perspective view of an indexing clamp according to an embodiment of the current invention, shown with jaws at an open configuration and with cradle at a rearward position.

FIGS. 1-17 illustrate an indexing sportsman's clamp 100 according to an embodiment of the current invention. The indexing clamp 100 includes a mobile base 110 having a pair of jaws 112 that are selectively locked in place relative to one another, an indexing post 120 extending from the mobile base 110, a shaft 130 extending from the indexing post 120, and a cradle 140 operably coupled to the shaft 130.

In the embodiment 100, the mobile base 110 is a pair of locking pliers having a handle end 111a and a fastening end 111b. The jaws 112 are at the fastening end 111b. Locking pliers are well known in the art and are disclosed, for example, in U.S. Pat. No. 2,280,005; U.S. Pat. No. 2,576,286; U.S. Pat. No. 6,626,070; and US 2012/0216657; the contents of each are incorporated herein in their entirety by reference. While various jaw configurations may be used, the jaws 112 include a serrated lower jaw 113 and an upper jaw 114 configured as a J-channel. The upper jaw 114 may having a passage 115 (FIG. 1) to allow the lower jaw 113 to travel through the J-channel.

The indexing post 120 extends from the mobile base 110 and may be formed with, welded to, riveted to, or otherwise attached to the mobile base 110. In the embodiment 100, the post 120 has a generally consistent cross section from a proximal end 122a to a distal end 122b—shown to be hexagonal in the drawings. Stops 125 extend outwardly from the post 120 to prevent undesired travel of the cradle 130 toward the mobile base 110, as explained further below. In some embodiments, the post 120 may have different cross-sectional shapes along its length, such as circular from the proximal end to the stop 125 and hexagonal from the stop to the distal end 122b; in such embodiments, a larger perimeter toward the proximal end 122a may actually form the stop 125. Moreover, some embodiments may alter the size of the post's cross section from the proximal end 122a to the distal end 122b, in effect forming a pyramid or a truncated pyramid. While an elongate hexagonal indexing post 120 is illustrated in the drawings, those skilled in the art will appreciate that other shapes may alternately be utilized, such as square, rectangular, triangular, octagonal, et cetera.

Figure 2:
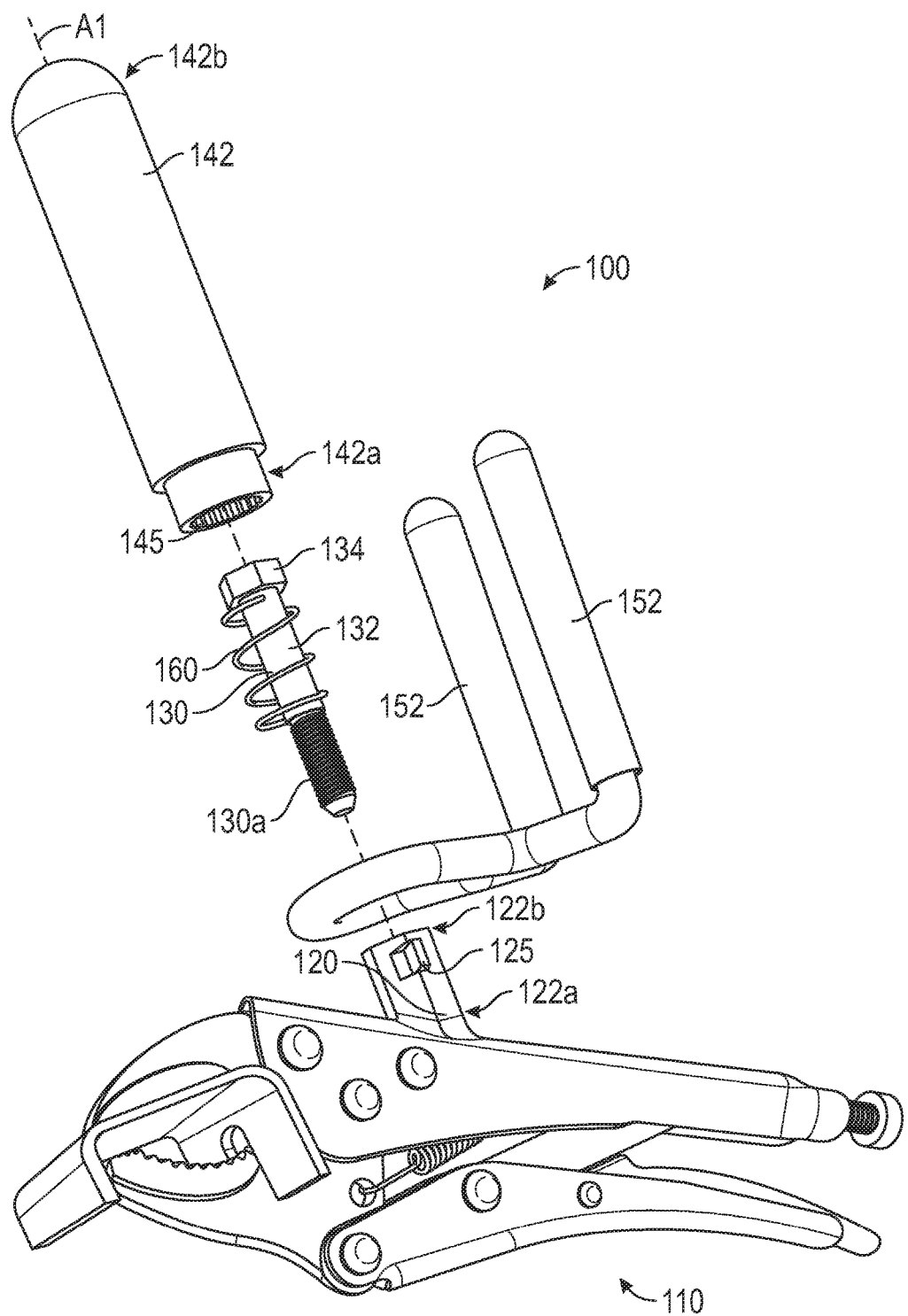
FIG. 2 is an exploded view of the indexing clamp of FIG. 1.
Figure 3:
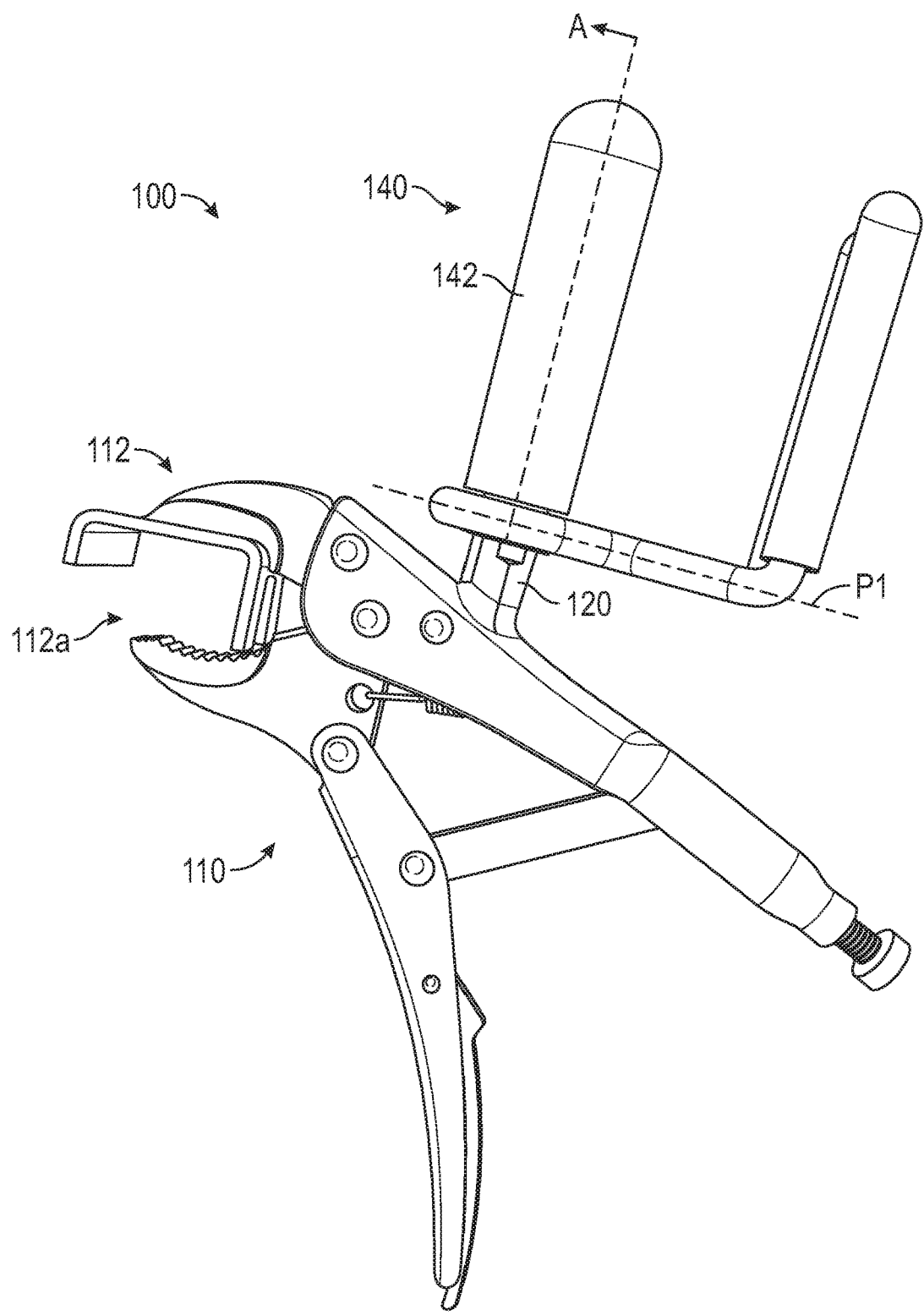
FIG. 3 is a side view of the indexing clamp of FIG. 1, shown with the jaws at the open configuration and the cradle at the rearward position.
Figure 4:
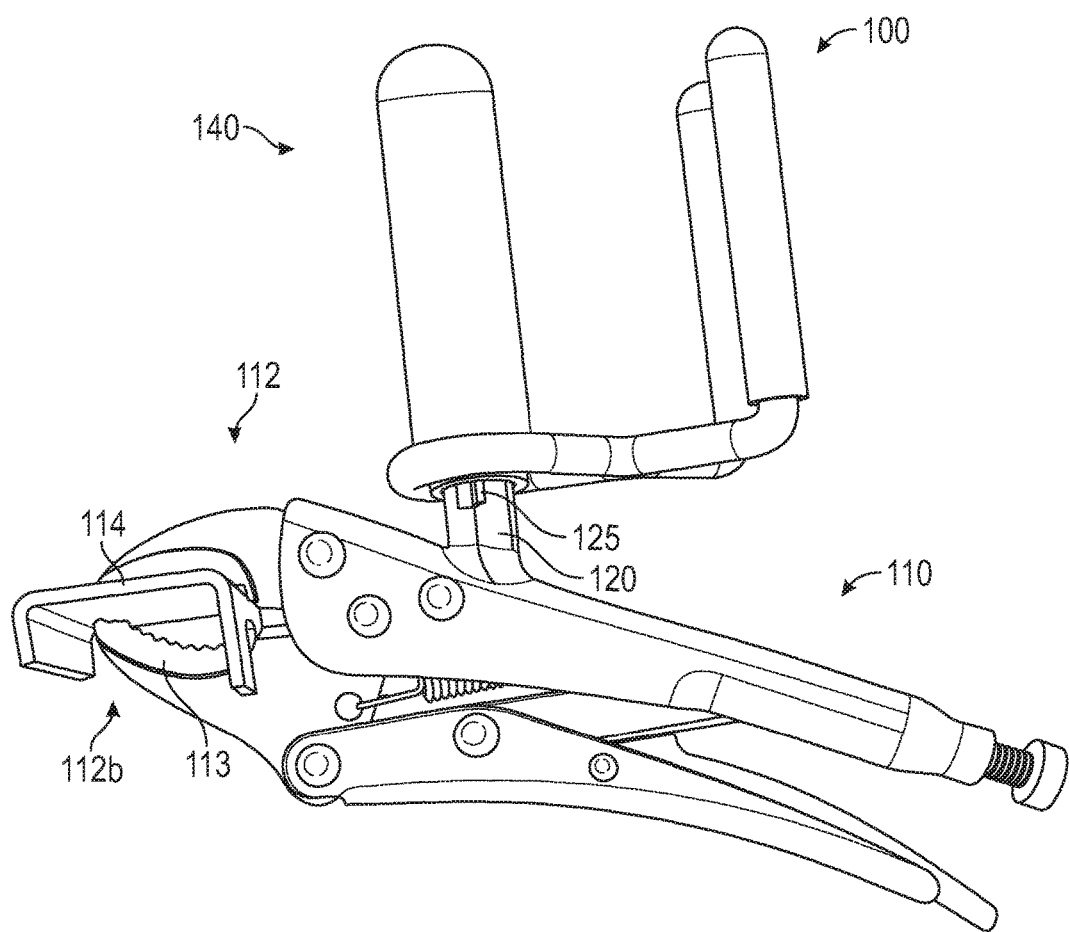
FIG. 4 is another side view of the indexing clamp of FIG. 1, shown with the jaws at a closed configuration and the cradle at the rearward position.
Figure 5:
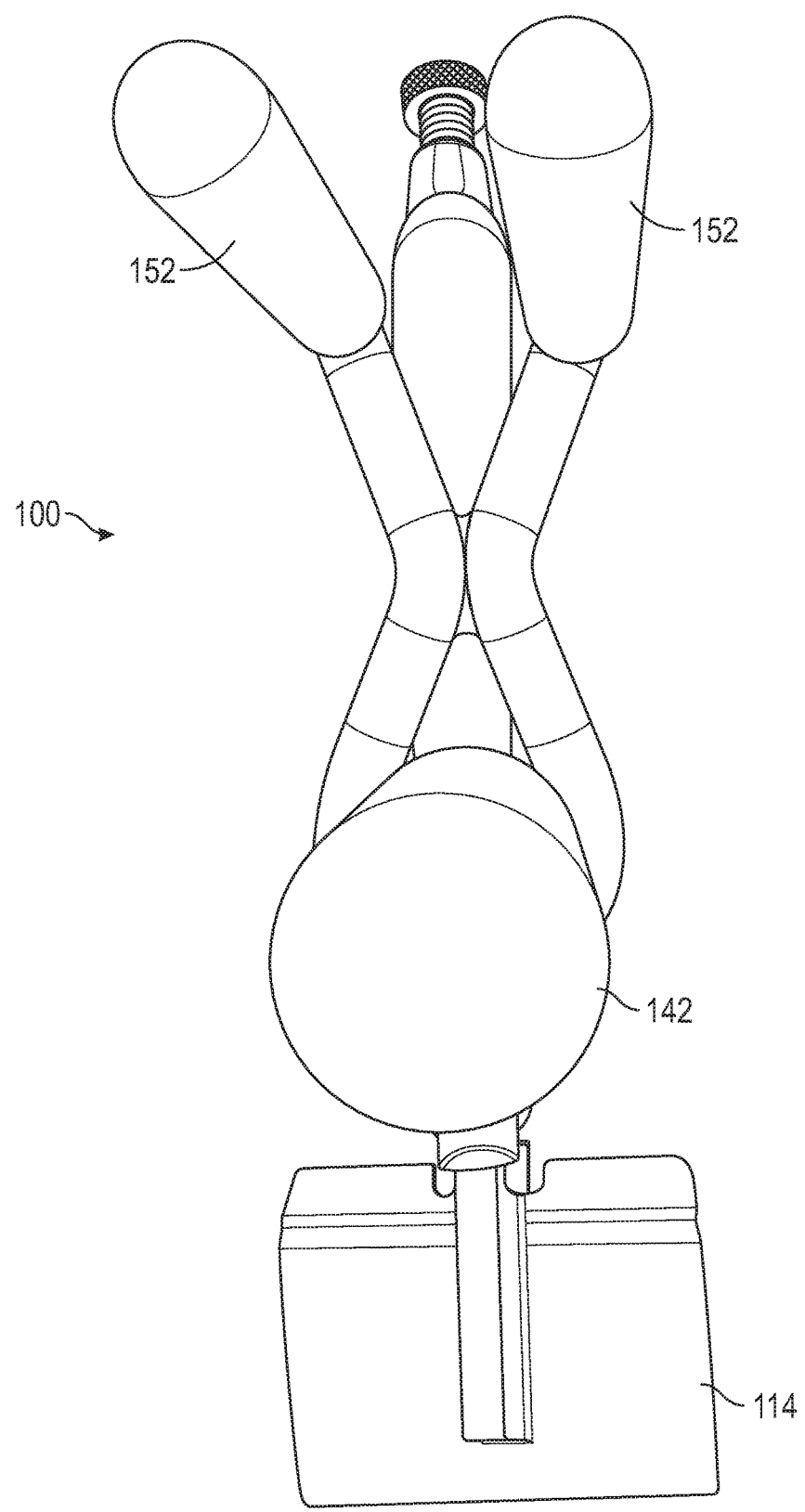
FIG. 5 is a top view of the indexing clamp of FIG. 1, shown with the jaws at the closed configuration and the cradle at the rearward position.
Figure 15:
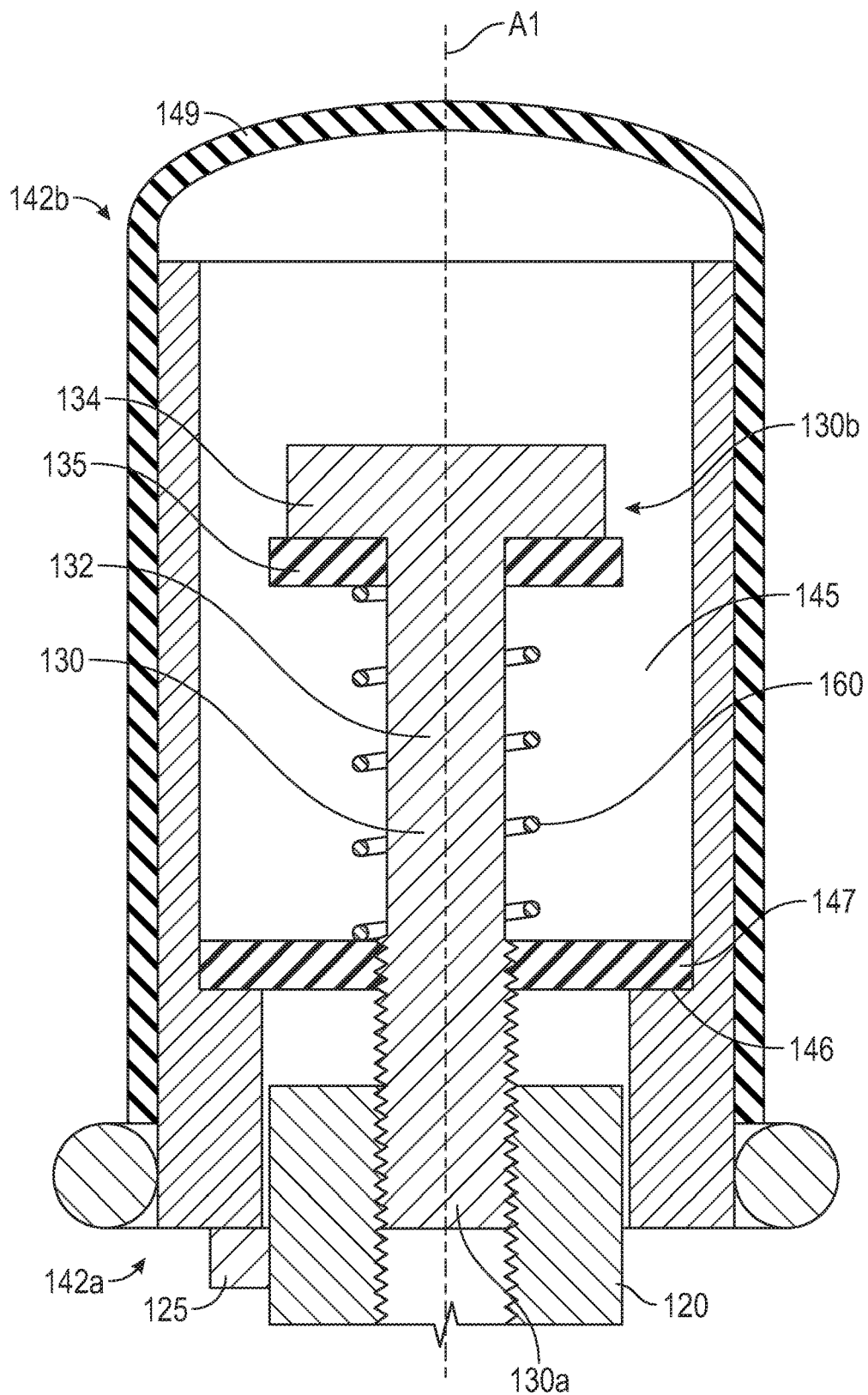
FIG. 15 is a section view cut along plane A in FIG. 3.

As best shown in FIG. 15, the shaft 130 extends from the indexing post 120. A diameter of the shaft 130 is smaller than a diameter of the indexing post 120, and the shaft 130 and the indexing post 120 are coaxial at an axis A1. As in embodiment 100, the shaft 130 may have one end 130a threaded into the indexing post 120. In other embodiments, the shaft 130 may be formed with or otherwise coupled to the indexing post 120. The shaft 130 also includes a lateral projection 130b spaced apart from the end 130a. As shown in FIGS. 2 and 15, the shaft 130 may be a bolt 132; and a head 134 of the bolt 132, along with a washer 135 if desired, may form the lateral projection 130b.

Figure 6:
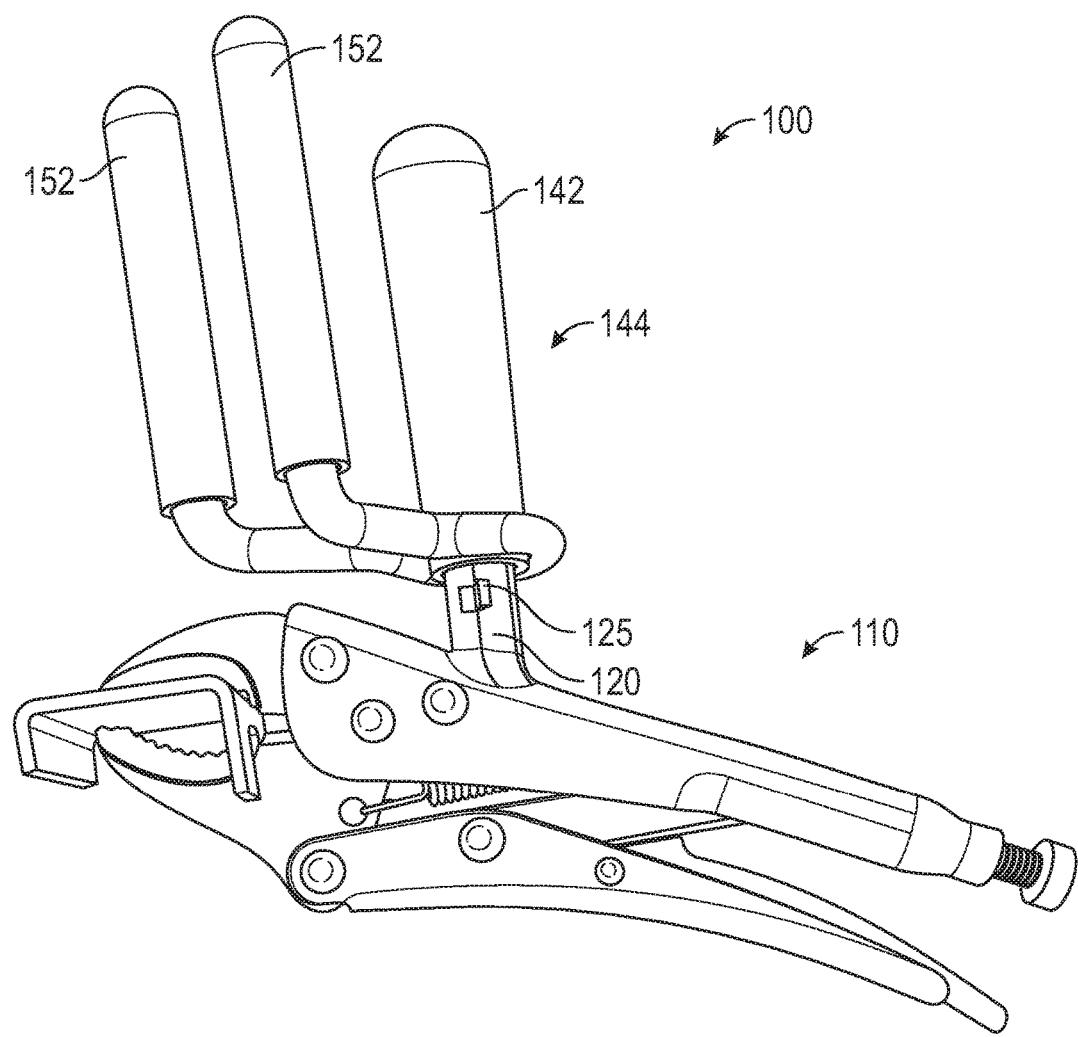
FIG. 6 is a side view of the indexing clamp of FIG. 1, shown with the jaws at the closed configuration and the cradle at a disengaged position.
Figure 7:
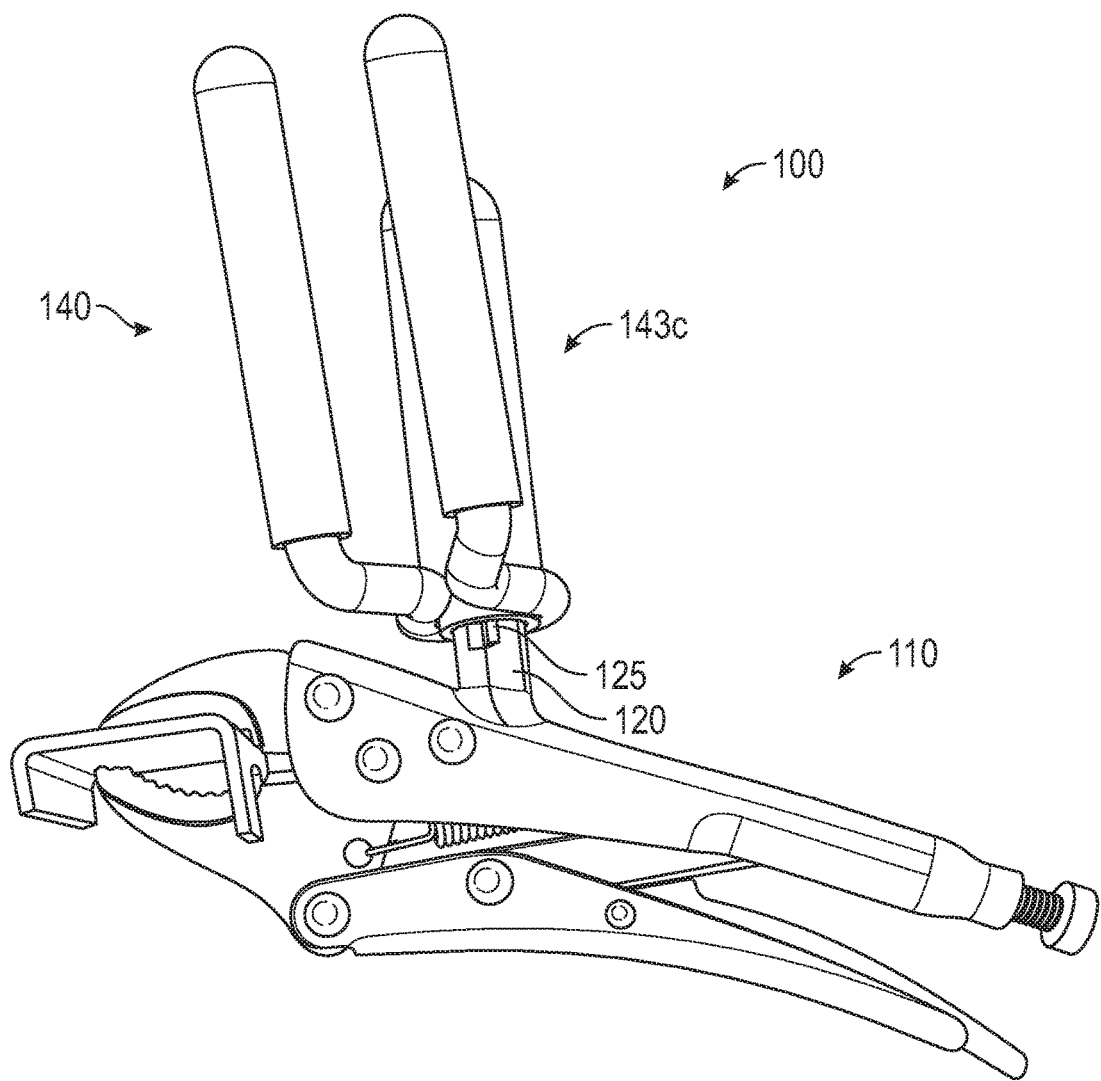
FIG. 7 is a side view of the indexing clamp of FIG. 1, shown with the jaws at the closed configuration and the cradle at an offset position.
Figure 8:
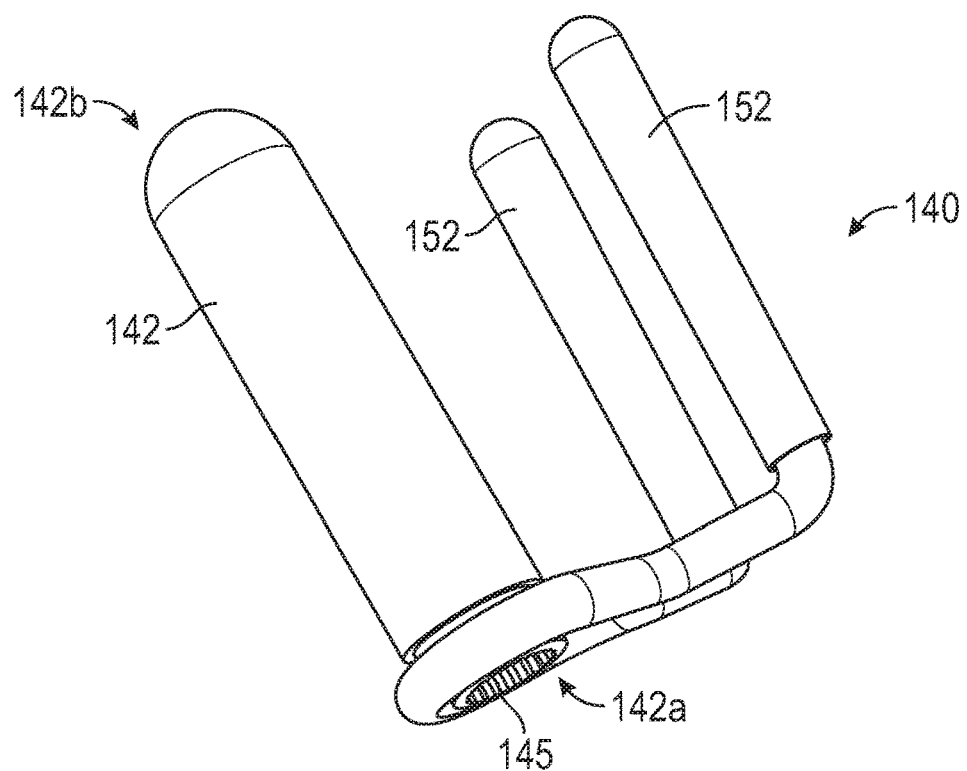
FIG. 8 is a perspective view of the cradle of the indexing clamp of FIG. 1.
Figure 9:
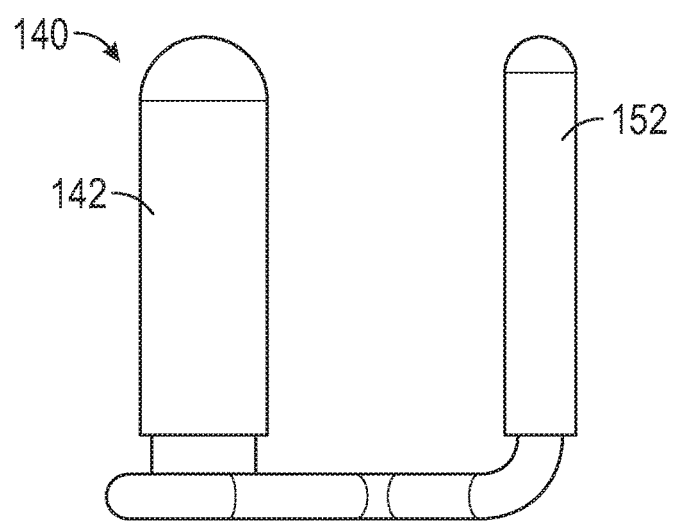
FIG. 9 is a side view of the cradle of FIG. 8.
Figure 10:
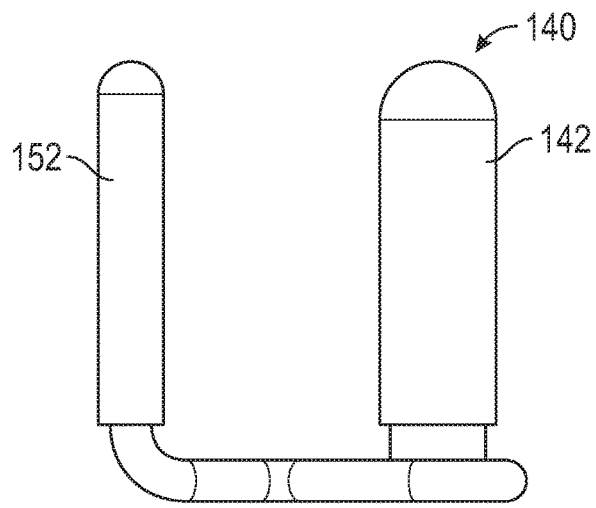
FIG. 10 is an opposite side view of the cradle of FIG. 8.
Figure 11:
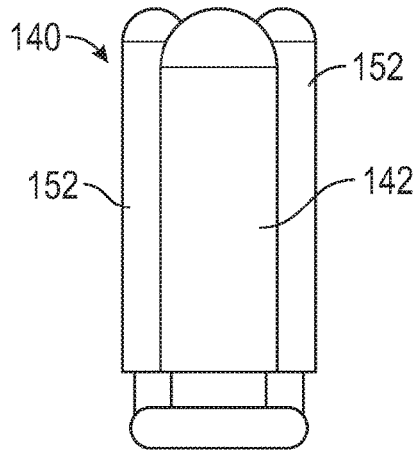
FIG. 11 is an end view of the cradle of FIG. 8.
Figure 12:
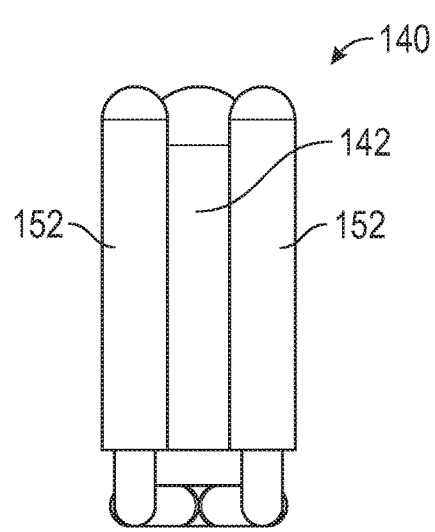
FIG. 12 is an opposite end view of the cradle of FIG. 8.
Figure 14:
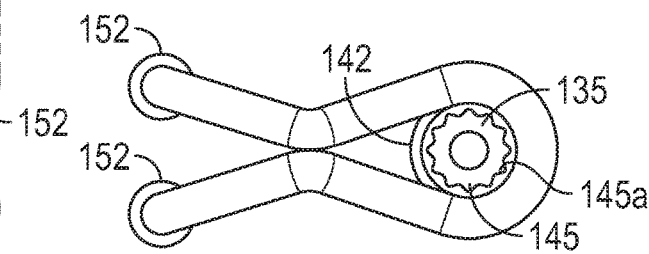
FIG. 14 is a bottom view of the cradle of FIG. 8.
Figure 16:
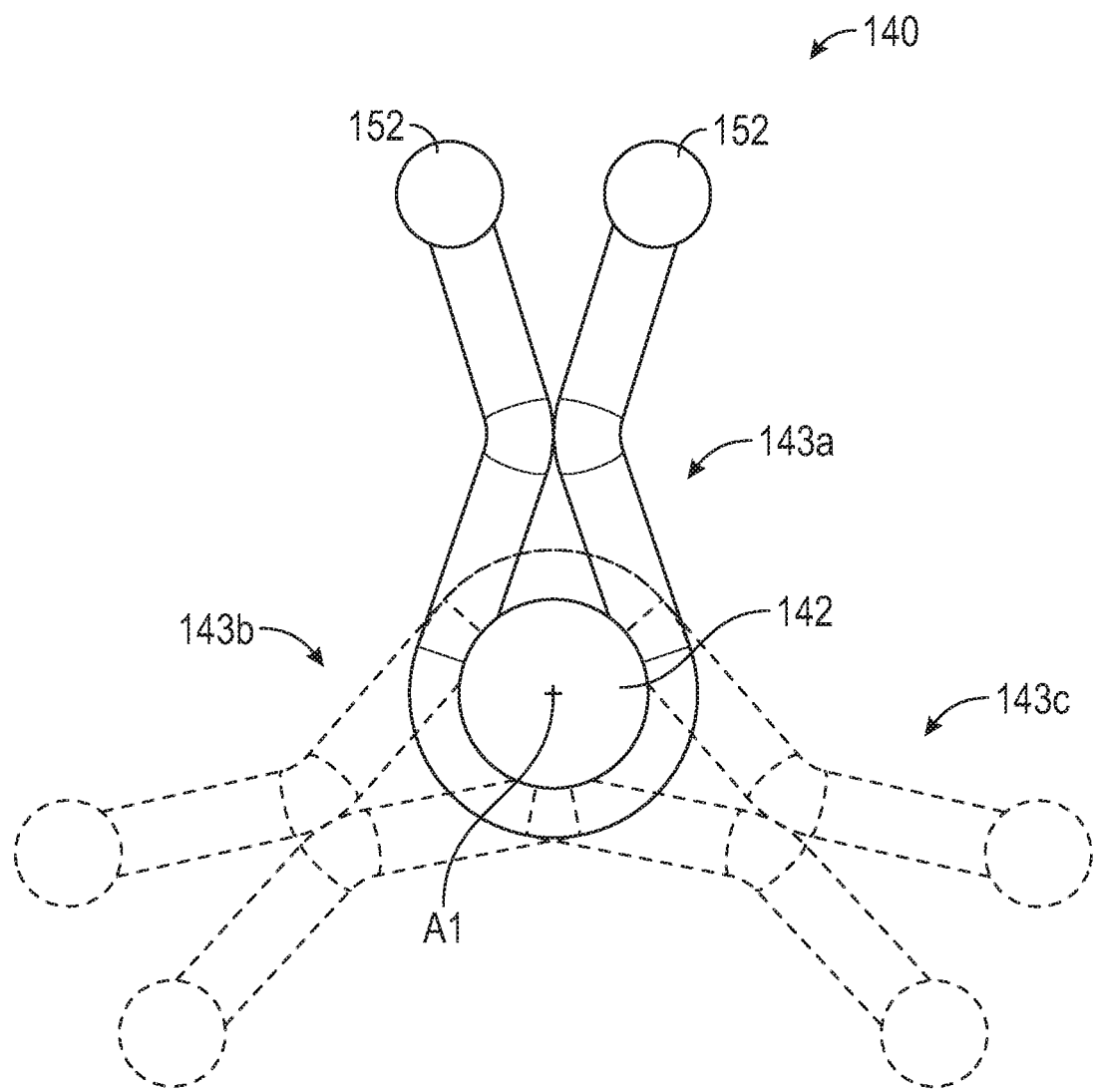
FIG. 16 is a partial top view of the indexing clamp of FIG. 1, shown with the cradle at various alternate positions in dashed lines.

Turning now to the cradle 140, the cradle 140 has a primary prong 142 and a pair of secondary prongs 152. The primary prong 142 has proximal and distal ends 142a, 142b, and a cavity 145 extends from the proximal end 142a toward the distal end 142b. As shown in FIG. 16, the primary prong 142 is selectively positionable at multiple lowered positions 143a, 143b, 143c that are angularly offset from one another about the axis A1. At least some of the lowered positions may be in a single lowered plane P1 (FIG. 3) that is generally perpendicular to the axis A1, and the primary prong 142 may abut the stop 125 when at the lowered positions. The primary prong 142 is also movable along the axis A1, such that the primary prong 142 is positionable at a raised position 144 (FIG. 6). The cavity 145 and the indexing post 120 are configured complementary to one another such that interference between the primary prong 142 and the indexing post 120 prevents the primary prong 142 from moving in the lowered plane P1 between the lowered positions 143a, 143b, 143c. For example, FIG. 14 illustrates an elongate twelve pointed star 145a that may receive the illustrated hexagonal indexing post 120 in twelve different lowered positions. But when at the raised position 144, on the other hand, the primary prong 142 is disengaged from the indexing post 120 and is rotatable about the axis A1. As such, the primary prong 142 may only be movable between the lowered positions 143a, 143b, 143c after the primary prong 142 moves to the raised position 144. In some embodiments, it may be desirable for the primary prong 142 to be rotatable both clockwise and counter-clockwise about the axis A1 when at the raised position 144.

A biasing member 160 biases the primary prong 142 away from the raised position 144. FIGS. 2 and 15 show the biasing member 160 as a helical spring. Yet other appropriate biasing members may also, or alternately, be used, such as a gas spring, magnets, a tensioning cord, et cetera.

As shown in FIG. 15, the cavity 145 may be a through hole extending from the proximal end 142a to the distal end 142b, and the cavity 145 may have one diameter at the proximal end 142a and a larger diameter at the distal end 142b, with the transition between the diameters defining a ledge 146. A push plate 147 may be seated on the ledge 146, and one end of the biasing member 160 may abut the push plate 147 while another end of the biasing member 160 abuts the lateral projection 130b. A sleeve 149, stopper, or other closure may cover the through hole at the distal end 142b.

Figure 13:
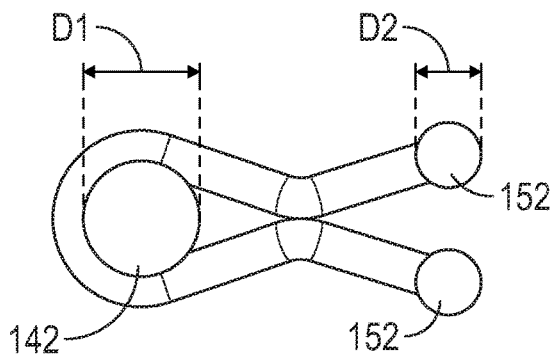
FIG. 13 is a top view of the cradle of FIG. 8.

The secondary prongs 152 extend generally parallel to the primary prong 142 (i.e., axes A2 of the secondary prongs 152 extend generally parallel to the axis A1) and may be positionally fixed relative to the primary prong 142, such that the secondary prongs 152 move along with the primary prong 142. As shown in FIG. 13, it may be desirable for a diameter D1 of the primary prong 142 to be substantially larger than (e.g., about twice as large as) a diameter D2 of each of the secondary prongs 152 (e.g., about seven-eighths of an inch and about seven-sixteenths of an inch). And it may be particularly desirable in some embodiments for each secondary prong axis A2 to be offset between about two inches and about three inches from the axis A1, and for a distance between the axes A2 to be between about seven-eighths of an inch and about one and one eighth of an inch.

Figure 17:
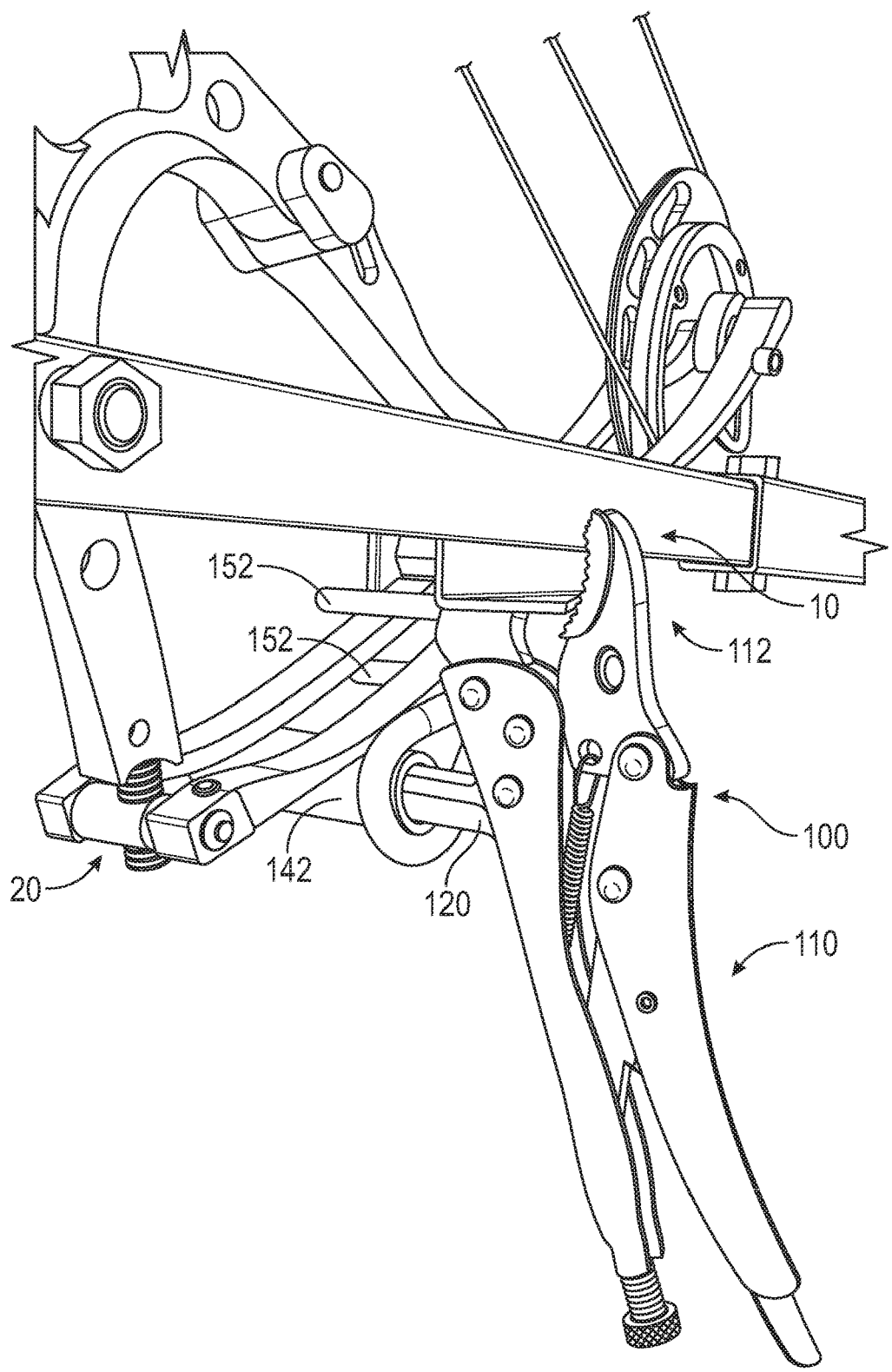
FIG. 17 is a perspective view of the indexing clamp of FIG. 1, shown in one method of use.

In use, the jaws 112 are initially at an open position 112a (FIG. 3), and are moved to a locked closed position 112b (FIG. 4) around environmental structure such as part of a tree stand, blind, tree, post, et cetera. FIG. 17 shows the jaws 112 closed about a post 10. The primary prong 142 is then moved to the raised position 144 (FIG. 6), and the cradle 140 is rotated about the axis A1 until the secondary prongs 152 are positioned as desired. The biasing member 160 then moves the primary prong 142 away from the raised position 144, positioning the primary prong in one of the lowered positions 143a, 143b, 143c. The number of lowered positions available depends on the configurations of the post 120 and the cavity 145. The stop 125 prevents the cradle 140 from continuing to the locking pliers 110. As shown in FIG. 17, a bow 20 or other sporting device (such as a firearm, fishing pole, et cetera) may rest upon the primary post 142 and at least one of the secondary posts 152. FIG. 17 shows part of the bow 20 resting on the primary post 142 and another part of the bow 20 passing between the secondary posts 152.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. An indexing clamp, comprising:
a mobile base having a handle end and a fastening end, the mobile base having a pair of jaws at the fastening end, the pair of jaws being selectively lockable in place relative to one another;
an indexing post extending from the mobile base;
a shaft extending from the indexing post, a diameter of the shaft being smaller than a diameter of the indexing post, the shaft and the indexing post being coaxial at an axis;
a primary prong having proximal and distal ends; the primary prong having a cavity extending from the proximal end toward the distal end; the primary prong being selectively positionable at a first lowered position, a second lowered position, and a raised position; the first and second lowered positions being angularly offset from one another about the axis; the primary prong being rotatable about the axis when at the raised position;
a biasing member biasing the primary prong away from the raised position; and
a pair of secondary prongs, each secondary prong extending generally parallel to the primary prong, each secondary prong being positionally fixed relative to the primary prong;
wherein the indexing post and the primary prong cavity are configured complementary to one another such that the primary prong is movable from the first lowered position to the second lowered position only after the primary prong moves to the raised position.

2. The indexing clamp of claim 1, wherein the shaft is a bolt threaded into the indexing post.

3. The indexing clamp of claim 2, wherein the biasing member is a helical spring.

4. The indexing clamp of claim 3, wherein the primary prong cavity is a through hole extending from the proximal end to the distal end.

5. The indexing clamp of claim 4, wherein the mobile base is a pair of locking pliers.

6. The indexing clamp of claim 5, wherein the indexing post is welded to the pair of locking pliers.

7. The indexing clamp of claim 6, further comprising a stop extending from the indexing post, the primary prong abutting the stop when at the first and second lowered positions.

8. The indexing clamp of claim 4, further comprising a sleeve covering the through hole at the primary prong distal end.

9. The indexing clamp of claim 1, wherein the mobile base is a pair of locking pliers.

10. The indexing clamp of claim 9, wherein the primary prong cavity is a through hole extending from the proximal end to the distal end.

11. The indexing clamp of claim 1, wherein:
a diameter of the primary prong is about twice as large as a diameter of each of the secondary prongs;
each of the secondary prongs has a secondary prong axis extending generally parallel to the axis; and
each secondary prong axis is offset between two and three inches from the axis.

12. The indexing clamp of claim 1, wherein the primary prong cavity is shaped as an elongate twelve-pointed star, and wherein the indexing post is shaped as an elongate hexagon.

13. The indexing clamp of claim 3, wherein:
the primary prong cavity is a through hole extending from the proximal end to the distal end, the through hole having a first diameter at the proximal end and a second diameter at the distal end, the second diameter being greater than the first diameter, transition of the first diameter to the second diameter defining a ledge;
a push plate is seated on the ledge; and
the helical spring abuts the push plate.

14. The indexing clamp of claim 13, wherein:
the shaft has a first end threaded into the indexing post and lateral projection spaced apart from the first end; and
the helical spring abuts the lateral projection.

15. The indexing clamp of claim 14, wherein the lateral projection comprises a bolt head and a washer.

16. The indexing clamp of claim 1, wherein the primary prong is rotatable clockwise and counter-clockwise about the axis when at the raised position.

17. The indexing clamp of claim 1, wherein:
the first and second lowered positions are in a lowered plane that is generally perpendicular to the axis; and
the indexing post and the primary prong cavity are configured such that interference between the primary prong and the indexing post prevents the primary prong from moving in the lowered plane from the first lowered position to the second lowered position.

18. The indexing clamp of claim 17, wherein:
the primary prong is selectively positionable at a third lowered position; the third lowered position being angularly offset from the first and second lowered positions about the axis; the third lowered position being in the lowered plane; and
the indexing post and the primary prong cavity are configured such that interference between the primary prong and the indexing post prevents the primary prong from moving in the lowered plane from: (a) any of the first lowered position, the second lowered position, and the third lowered position; to: (b) any other of the first lowered position, the second lowered position, and the third lowered position.

19. The indexing clamp of claim 1, wherein:
the primary prong is selectively positionable at a third lowered position; the first, second, and third lowered positions being angularly offset from one another about the axis; the first, second, and third lowered positions being in a lowered plane that is generally perpendicular to the axis; and
the indexing post and the primary prong cavity are configured such that interference between the primary prong and the indexing post prevents the primary prong from moving in the lowered plane from: (a) any of the first lowered position, the second lowered position, and the third lowered position; to: (b) any other of the first lowered position, the second lowered position, and the third lowered position.

\* \* \* \* \*